(No Model.)
M. SILVERMAN.
CHRISTMAS TREE HOLDER.
No. 594,491.  Patented Nov. 30, 1897.
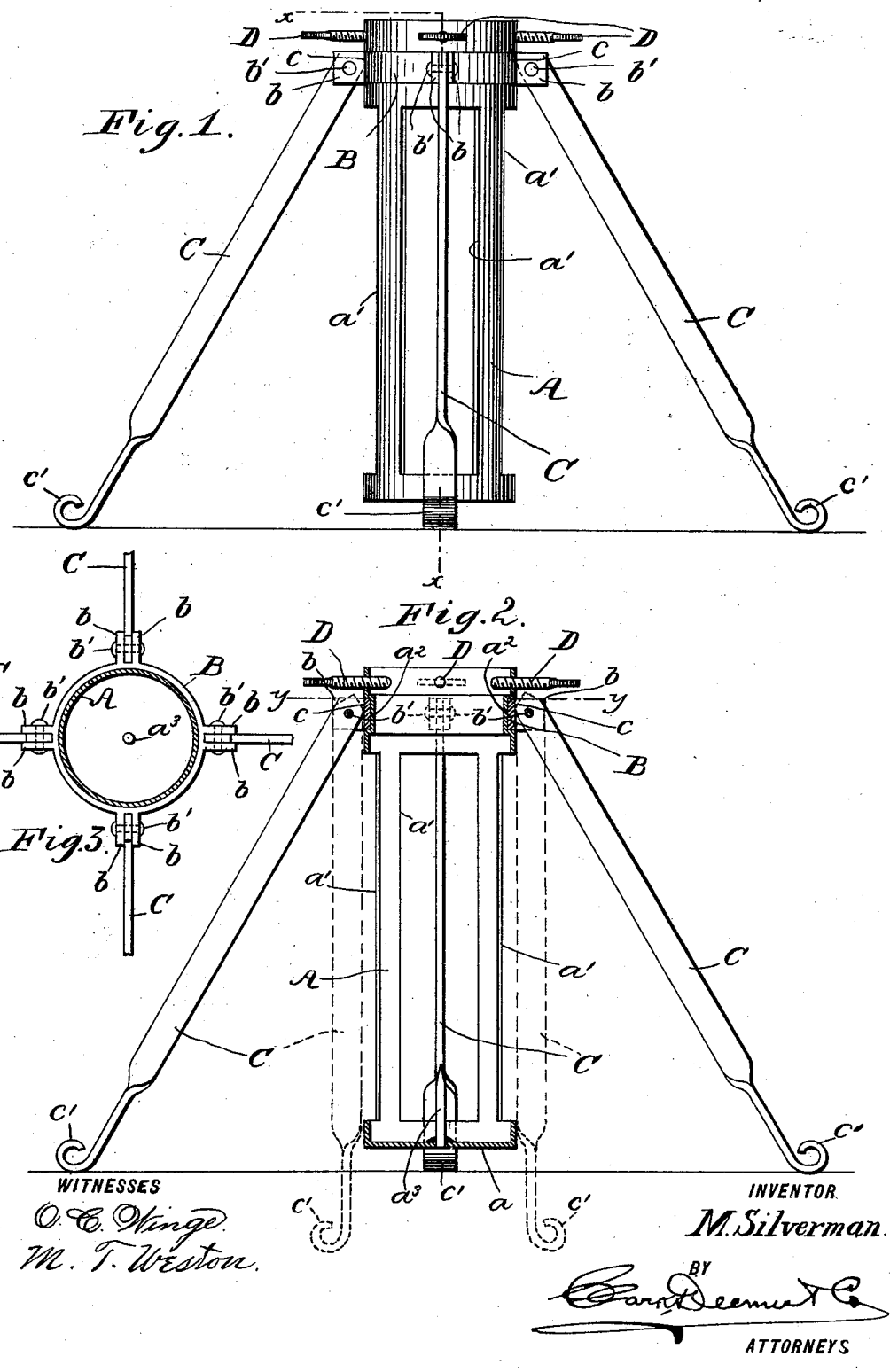
WITNESSES
O. C. Winge
M. T. Weston
INVENTOR
M. Silverman
BY
ATTORNEYS

United States Patent Office.

MARCELL SILVERMAN, OF NEW YORK, N. Y., ASSIGNOR OF ONE-HALF TO LOUIS BLOECKER, OF SAME PLACE.

CHRISTMAS-TREE HOLDER.

SPECIFICATION forming part of Letters Patent No. 594,491, dated November 30, 1897.

Application filed July 21, 1897. Serial No. 645,338. (No model.)

*To all whom it may concern:*

Be it known that I, MARCELL SILVERMAN, a citizen of the United States, and a resident of New York city, county of New York, and State of New York, have invented certain new and useful Improvements in Christmas-Tree Holders, of which the following is a specification, reference being had to the accompanying drawings, forming a part thereof, in which similar letters of reference indicate corresponding parts.

This invention relates to an improved adjustable Christmas-tree holder; and the object thereof is to provide an efficient device of this character adapted for securely supporting trees having trunks of varying diameters. Further, the device is capable of being folded for the purpose of taking up but little room while being shipped or stored, and it is inexpensive and durable.

The invention will be hereinafter fully described, and specifically set forth in the annexed claims.

In the accompanying drawings, forming part of this specification, Figure 1 is a side elevation of my improved device, showing the same placed in position for receiving a tree. Fig. 2 is a vertical sectional elevation taken on the line $x\,x$ of Fig. 1, and Fig. 3 is a sectional plan view taken on the line $y\,y$ of Fig. 2.

In the practice of my invention I provide a cylindrical box A, having an integrally-formed bottom $a$ thereon and being opened at the top. This said box is pierced by elongated apertures $a'$ for the purpose of lightening the structure.

Around the upper edge of the box A an annular groove $a^2$ is formed. This said groove engages a collar B, which has a series of brackets $b$ extended radially therefrom. Pivoted to these said brackets by means of bolts or rivets $b'$ are a series of folding legs C, adapted for supporting the box A. These said legs have shoulders $c$ formed upon their upper ends, which engage with collars B when the device is in its opened or operative position, as illustrated by full lines of the drawings, whereby the legs are extended at an angle adapted for securely supporting the box.

Projected upwardly from the bottom $a$ of the box A is a pin $a^3$, adapted to pierce the trunk of the tree for the purpose of securing the same, and the tree is further secured by means of a series of radially-projected thumb-screws D, which pass through the upper end of the box A, whereby a tree having a trunk of a smaller diameter than the cylinder or box A can be secured or fastened therein.

The cylinder A is preferably composed of sheet metal, and the legs C are composed of strips of malleable iron having upturned feet $c'$ formed thereon; but I do not confine myself to any specific structure, as it is obvious that under the scope of my invention I am entitled to the use of castings in the construction of the device, if desired.

It will be noted that the collar B, which carries the supporting-legs, is loosely mounted within the annular groove $a^2$, whereby the box A can be readily turned around to bring the tree in any desired position after it is set within the box.

Having thus described my invention, what I claim as new, and desire to secure by Letters Patent, is—

1. A Christmas-tree holder, comprising a cylindrical box having an annular groove formed in the exterior upper portion thereof, and a spur projected upwardly from the bottom thereof and a collar secured within the groove, said collar having a series of radial projections thereon to which are pivotally attached folding legs, said legs having shoulders on the upper ends thereof for engagement with the collar, whereby they may be extended at an angle for supporting the box, substantially as shown and described.

2. In a Christmas-tree holder, the combination of a cylindrical box having a spur extended upwardly from the bottom thereof, an annular groove in the upper portion thereof and a series of thumb-screws extended radially through the upper end thereof, and a series of swinging legs or supports, said legs pivoted to radial projections forming part of a collar secured within the groove on the upper end of the box, substantially as shown and described.

In testimony that I claim the foregoing as my invention I have signed my name, in presence of two witnesses, this 16th day of July, 1897.

MARCELL SILVERMAN.

Witnesses:
B. McComb,
M. G. McClean.